UNITED STATES PATENT OFFICE.

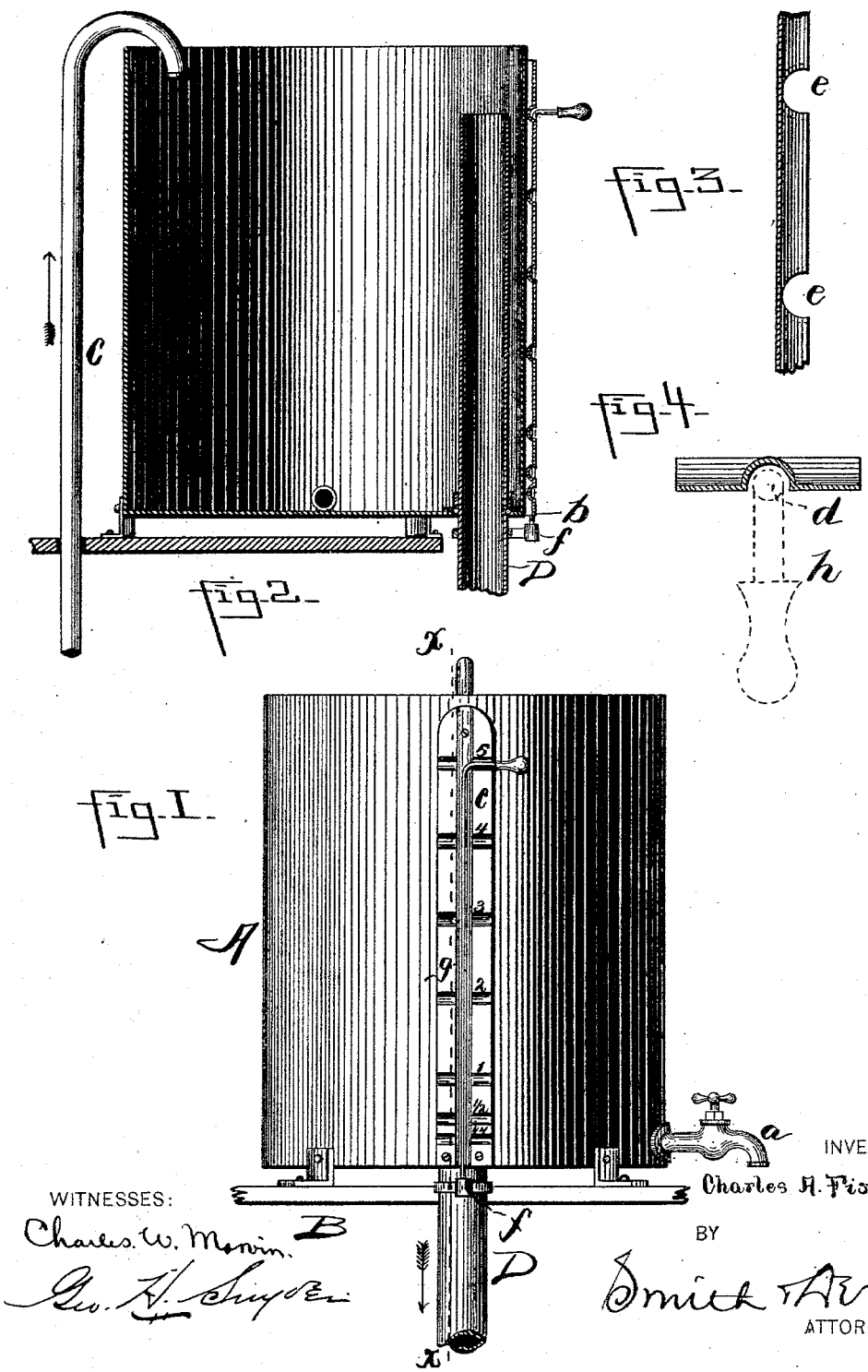

CHARLES A. FISH, OF SYRACUSE, NEW YORK.

DEVICE FOR MEASURING LIQUIDS.

SPECIFICATION forming part of Letters Patent No. 559,794, dated May 12, 1896.

Application filed January 3, 1896. Serial No. 574,277. (No model.)

*To all whom it may concern:*

Be it known that I, CHARLES A. FISH, of Syracuse, in the county of Onondaga, in the State of New York, have invented new and useful Improvements in Devices for Measuring Liquids, of which the following, taken in connection with the accompanying drawings, is a full, clear, and exact description.

This invention relates to improvements in liquid-measures which are adjustable so that the measure can be set so as to hold any quantity of liquid desired.

My object is to produce a simple and inexpensive device for measuring liquids, such as kerosene-oil, whereby I can dispense with the ordinary separate measuring devices and combine in one receptacle a device having a large range of measuring capacity, from a very small one to a very large one; and to that end my invention consists in the several new and novel features and combination of parts hereinafter described, and which are specifically set forth in the claim hereunto annexed.

It is constructed as follows, reference being had to the accompanying drawings, in which—

Figure 1 is a side view of the device complete mounted upon the tank (broken away) which contains the liquid. Fig. 2 is a section on line $x$ $x$ of Fig. 1. Fig. 3 is a vertical section of the rack secured upon the outer face of the measuring-can. Fig. 4 is a transverse section thereof, showing the operating-handle in dotted lines.

A is the measuring-receptacle, mounted in any ordinary way, either upon a shelf above the can B, containing the liquid, or upon the can itself, and provided with a draw-off cock $a$ in its bottom and means for filling the receptacle A from the can B in any ordinary manner by pumping it through a pipe C. Adjacent to one side of the receptacle A is slidingly mounted a pipe D, passing through the stuffing-box $b$ in the bottom of the can, which acts as an overflow-pipe to convey the liquid back into the storage vessel. Upon the outer face of the receptacle A is a rack $c$, having a vertical central opening $d$ and laterally-extending grooves $e$.

$f$ is an arm secured around the pipe D below the receptacle A, and upon its outer end is mounted a rod $g$, secured thereto, the said rod $g$ having its upper end bent over and provided with a handle, as shown at $h$, for the purpose of operating the said rod $g$.

The rack $c$ is marked off or graduated into gallons, divisions or multiples thereof, and a lateral groove $e$ is formed in the rack at each point of graduation.

My invention is operated as follows: When it is desired to draw five gallons (for illustration) of the liquid, I take hold of the handle $h$ and raise the rod $g$ up to the point shown in Fig. 2, and then turn it one-quarter of the way around, so as to have the turned end lie in the groove opposite the five-gallons mark, as shown in Fig. 1. I then pump into the can through the pipe C until the liquid flows over the top of the pipe D, which indicates that five gallons have been drawn. If I desire to draw any less amount, I perform the same operation, except that I set the handle in any of the other grooves indicating the amount desired.

Having described my invention, what I claim, and desire to secure by Letters Patent, is—

The herein-described measuring device comprising a receptacle provided with means for filling it, and drawing off the liquid a vertically-adjustable stand-pipe, connecting the receptacle and the storage vessel, a rack upon one face graduated and having longitudinal and lateral goooves therein, the rod, G, having its upper end bent over and adapted to travel in said vertical grooves and upper end adapted to rest in said lateral groove.

In witness whereof I have hereunto set my hand on this 18th day of December, 1895.

CHAS. A. FISH.

In presence of—
JESSIE E. MURRAY,
HOWARD P. DENISON.